US011881747B2

United States Patent
Yamaguchi et al.

(10) Patent No.: US 11,881,747 B2
(45) Date of Patent: Jan. 23, 2024

(54) MOTOR

(71) Applicant: NIDEC CORPORATION, Kyoto (JP)

(72) Inventors: Yuhei Yamaguchi, Kyoto (JP); Takayuki Makino, Kyoto (JP); Keigo Nakamura, Kyoto (JP); Hisashi Fujihara, Kyoto (JP)

(73) Assignee: NIDEC CORPORATION, Kyoto (JP)

( * ) Notice: Subject to any disclaimer, the term of this patent is extended or adjusted under 35 U.S.C. 154(b) by 485 days.

(21) Appl. No.: 17/278,650

(22) PCT Filed: Sep. 26, 2019

(86) PCT No.: PCT/JP2019/037790
§ 371 (c)(1),
(2) Date: Mar. 22, 2021

(87) PCT Pub. No.: WO2020/067255
PCT Pub. Date: Apr. 2, 2020

(65) Prior Publication Data
US 2022/0037967 A1 Feb. 3, 2022

(30) Foreign Application Priority Data
Sep. 28, 2018 (JP) .................. 2018-185206

(51) Int. Cl.
*H02K 11/33* (2016.01)
*H02K 5/16* (2006.01)
(Continued)

(52) U.S. Cl.
CPC ............... *H02K 11/33* (2016.01); *H02K 5/16* (2013.01); *H02K 5/225* (2013.01); *H02M 7/003* (2013.01); *H02K 5/10* (2013.01)

(58) Field of Classification Search
CPC .......... H02K 11/33; H02K 5/16; H02K 5/225; H02K 5/10; H02K 2203/03; H02K 2203/09; H02M 7/003
See application file for complete search history.

(56) References Cited

U.S. PATENT DOCUMENTS 8,363,353 B2   1/2013  Yuwata
10,079,520 B2  9/2018  Haga et al.
(Continued)

FOREIGN PATENT DOCUMENTS

CN   206894408 U   1/2018
JP   2001309600 A  11/2001
(Continued)

OTHER PUBLICATIONS

International Search Report in PCT/JP2019/037790, dated Dec. 17, 2019. 2pp.

*Primary Examiner* — Thomas Truong
(74) *Attorney, Agent, or Firm* — HAUPTMAN HAM, LLP

(57) ABSTRACT

A motor includes a rotor configured to rotate about a central axis extending in an up-down direction, a stator located radially outside the rotor, a bracket located above the stator, a circuit board held by the bracket and disposed along a plane perpendicular to an axial direction, and a bus bar held by the bracket and connected to the circuit board at a terminal connection portion. The bracket includes a board support portion supporting the circuit board from below, and a wall portion protruding upward to be higher than the board support portion and surrounding the circuit board. The wall portion has a cutout portion extending downward from an upper end of the wall portion.

15 Claims, 5 Drawing Sheets

(51) Int. Cl.
*H02K 5/22* (2006.01)
*H02M 7/00* (2006.01)
*H02K 5/10* (2006.01)

(56) References Cited

U.S. PATENT DOCUMENTS

| | | | | |
|---|---|---|---|---|
| 2007/0178723 A1* | 8/2007 | Kataoka | ............... | H05K 1/0263 |
| | | | | 439/76.2 |
| 2014/0021833 A1* | 1/2014 | Nakai | .................. | H02K 11/225 |
| | | | | 310/68 D |

FOREIGN PATENT DOCUMENTS

| | | |
|---|---|---|
| JP | 2004248492 A | 9/2004 |
| JP | 2010158094 A | 7/2010 |
| WO | 2017098907 A1 | 6/2017 |

* cited by examiner

MOTOR

CROSS-REFERENCE TO RELATED APPLICATIONS

This is the U.S. national stage of International application No. PCT/JP2019/037790, filed on Sep. 26, 2019, and priority under 35 U.S.C. § 119(a) and 35 U.S.C. § 365(b) is claimed from Japanese Patent Application No. 2018-185206, filed on Sep. 28, 2018, the entire contents of which are incorporated herein by reference.

TECHNICAL FIELD

The present invention relates to a motor.

BACKGROUND

There has conventionally been known a motor including a circuit board, a bus bar, and a bracket that holds the circuit board and the bus bar. For example, there has been known a brushless motor including a board, a terminal, an intermediate bracket that holds the board and the terminal, and an end cover that covers the intermediate bracket. In the brushless motor, the intermediate bracket and the end cover each include a cylindrical peripheral wall, and are radially aligned by fitting their peripheral walls to each other.

In the brushless motor, the board is disposed inside the peripheral wall of the intermediate bracket. Consequently, in soldering the terminal to the board, a soldering tool, such as a soldering iron, is brought close to an upper surface of the board, so that the soldering tool may possibly interfere with the peripheral wall. Thus, such a motor has a problem that manufacturing processes become complicated.

SUMMARY

An exemplary motor according to the present invention includes a rotor configured to rotate about a central axis extending in an up-down direction, a stator located radially outside the rotor, a bracket located above the stator, a circuit board held by the bracket and disposed along a plane perpendicular to an axial direction, and a bus bar held by the bracket and connected to the circuit board at a terminal connection portion. The bracket includes a board support portion supporting the circuit board from below, and a wall portion protruding upward to be higher than the board support portion and surrounding the circuit board. The wall portion has a cutout portion extending downward from an upper end of the wall portion.

The above and other elements, features, steps, characteristics and advantages of the present disclosure will become more apparent from the following detailed description of the preferred embodiments with reference to the attached drawings.

DETAILED DESCRIPTION

Hereinafter, a motor according to an embodiment of the present invention will be described with reference to the drawings. Note that, in the following drawings, scales, numbers, and the like of structures may be different from those of actual structures for the sake of clearly illustrating configurations.

Some of the drawings illustrate a Z-axis. Some of the drawings appropriately illustrate a central axis J that is a virtual line extending in a direction parallel to a Z-axis. In the following description, an axial direction of the central axis J, that is, a direction parallel to the Z axis is simply referred to by the term "axial direction", "axial", or "axially"; a radial direction centered on the central axis J is simply referred to by the term "radial direction", "radial", or "radially; and a circumferential direction about the central axis J is simply referred to by the term "circumferential direction", "circumferential", or "circumferentially".

In the present specification, a positive direction of the Z-axis in the axial direction may be referred to as an "upper side", and a negative direction of the Z-axis in the axial direction may be referred to as a "lower side". Note that, the terms "up-down direction", "upper side", and "lower side" are direction-related terms used merely for description, and do not limit actual positional relationships and actual orientations of the motor in the use of the motor.

Figure 1:
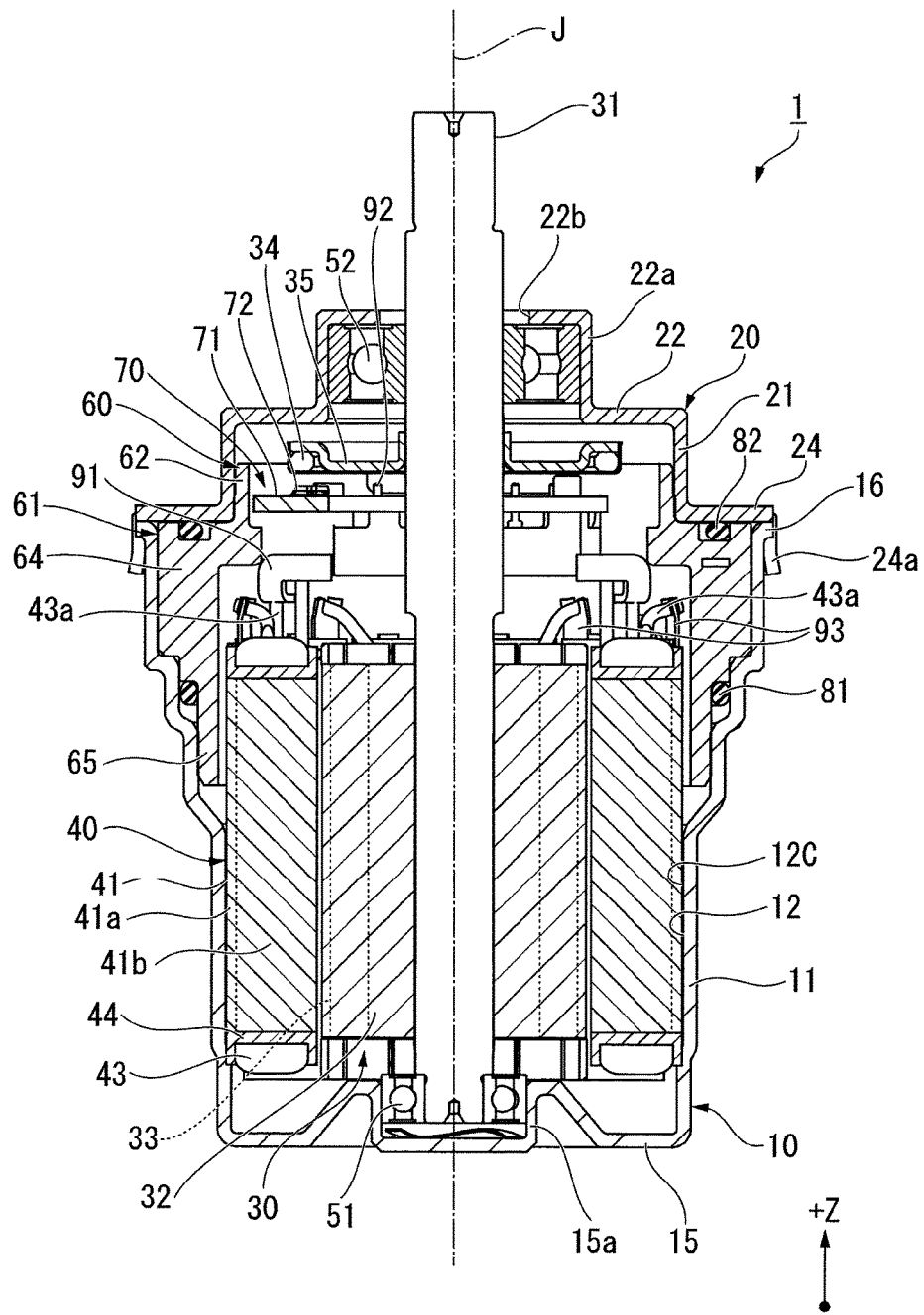
FIG. 1 is a cross-sectional view of a motor according to one embodiment.

FIG. 1 is a cross-sectional view of a motor 1 of the present embodiment.

The motor 1 of the present embodiment is a brushless motor. As illustrated in FIG. 1, the motor 1 includes a housing 10, a cover member 20, a rotor 30 including a shaft 31, a stator 40, bearings 51 and 52, a circuit board 70, a bus bar assembly 60, a first sealing member 81, and a second sealing member 82. In the present embodiment, the first sealing member 81 and the second sealing member 82 are O-rings. In the following description, the first sealing member 81 is referred to as a lower O-ring 81 and the second sealing member 82 is referred to as an upper O-ring 82. The bearings include a lower bearing 51 and an upper bearing 52.

The housing 10 houses the stator 40. The housing 10 holds the stator 40 and the lower bearing 51. The housing 10 is made of, for example, metal. The housing 10 has a shape of a tube that is open upward. The housing 10 includes a housing tubular portion 11, a bottom portion 15, and a flange portion 16.

The housing tubular portion 11 has a multi-stage cylindrical shape having inside diameters and outside diameters that axially vary concentrically to the central axis J. The housing tubular portion 11 has a plate thickness that is substantially uniform in the axial direction. The housing tubular portion 11 surrounds the stator 40 radially from the outside.

Figure 2:
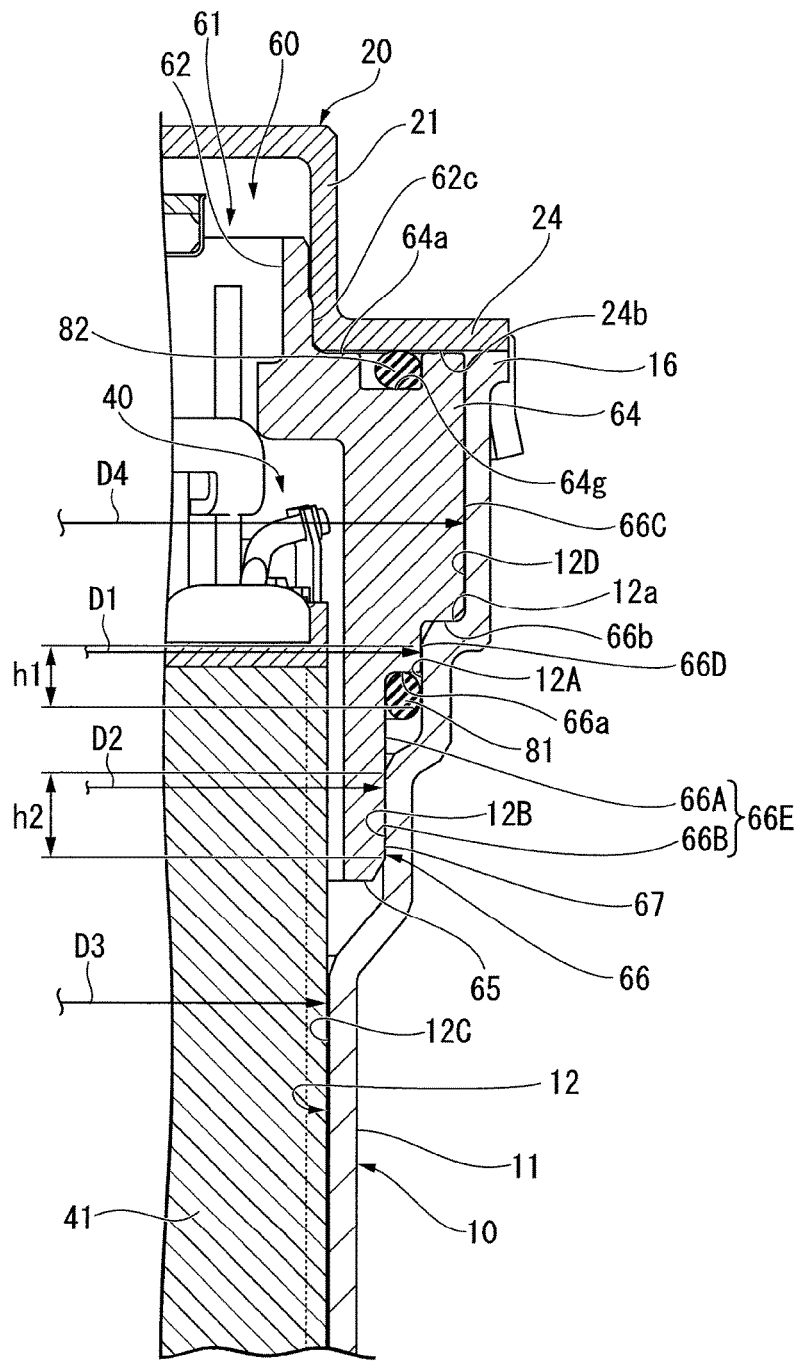
FIG. 2 is a partially enlarged view of an opening side of a housing tubular portion in FIG. 1.

FIG. 2 is a partially enlarged view of an opening side of the housing tubular portion 11 in FIG. 1.

The housing tubular portion 11 has an inner peripheral surface 12 facing radially inward. The inner peripheral surface 12 is divided into a plurality of regions that are axially arranged and have different inside diameters. The inner peripheral surface 12 includes an upper end inner peripheral region 12D, a first inner peripheral region 12A, a second inner peripheral region 12B, and a third inner peripheral region 12C. The upper end inner peripheral region 12D, the first inner peripheral region 12A, the second inner peripheral region 12B, and the third inner peripheral region 12C are arranged in this order from top to bottom. The upper end inner peripheral region 12D, the first inner peripheral region 12A, the second inner peripheral region 12B, and the third inner peripheral region 12C respectively have inside diameters that are gradually smaller in this order.

The upper end inner peripheral region 12D has a fourth inside diameter D4 and is substantially circular when viewed in the axial direction. The first inner peripheral region 12A has a first inside diameter D1 and is circular when viewed in the axial direction. The first inner peripheral region 12A is located lower than the upper end inner peripheral region 12D. The second inner peripheral region 12B has a second inside diameter D2 and is substantially circular when viewed in the axial direction. The second inner peripheral region 12B is located lower than the first inner peripheral region 12A. The third inner peripheral region 12C has a third inside diameter D3 and is substantially circular when viewed in the axial direction. The third inner peripheral region 12C is located lower than the second inner peripheral region 12B.

The first inside diameter D1 is smaller than the fourth inside diameter D4. The second inside diameter D2 is smaller than the first inside diameter D1. The third inside diameter D3 is smaller than the second inside diameter D2. That is, the first inside diameter D1 to the fourth inside diameter D4 have a relationship of D4>D1>D2>D3.

The upper end inner peripheral region 12D, the first inner peripheral region 12A, and the second inner peripheral region 12B radially face an outer peripheral surface of the bus bar assembly 60. Meanwhile, the third inner peripheral region 12C radially faces an outer peripheral surface of the stator 40. The outer peripheral surface of the stator 40 is fitted to the third inner peripheral region 12C. According to the present embodiment, the inner peripheral surface 12 of the housing tubular portion 11 includes the third inner peripheral region 12C and is fitted to the outer peripheral surface of the stator 40 in the third inner peripheral region 12C. Consequently, the stator 40 can easily be positioned radially with respect to the housing 10. Note that, reference herein to "fitting" including grammatical variations thereof includes at least one of references to "facing" including grammatical variations thereof and "in contact with" including grammatical variations thereof. Moreover, the "fitting" may be performed directly or indirectly by means of, for example, a rib.

As illustrated in FIG. 1, the bottom portion 15 is located at a lower end of the housing tubular portion 11. The bottom portion 15 covers a lower opening of the housing tubular portion 11. In the present embodiment, the lower end of the housing tubular portion 11 is formed integrally with the bottom portion 15. The bottom portion 15 includes a lower bearing holding portion 15a in the center thereof in plan view. In the present embodiment, the lower bearing holding portion 15a is a recessed portion that is recessed axially downward. The lower bearing holding portion 15a holds the lower bearing 51 therein. Note that, in the interior of the lower bearing holding portion 15a, an elastic member (for example, a preload spring) may be interposed between the lower bearing 51 and the bottom portion 15.

The flange portion 16 is located at an upper end of the housing tubular portion 11. The flange portion 16 extends radially outward from the upper end of the housing tubular portion 11. In the present embodiment, the housing 10 is fixed to the cover member 20 at the flange portion 16.

The cover member 20 is attached to an upper part of the housing 10. The cover member 20 covers the stator 40, the bus bar assembly 60, and the circuit board 70 from above. Moreover, the cover member 20 is located above a bracket 61 of the bus bar assembly 60 to be described later. The cover member 20 holds the upper bearing 52. The cover member 20 is made of, for example, metal. The cover member 20 includes a tubular portion (hereinafter, referred to as a cover tubular portion) 21, a lid portion 22, and a cover flange portion 24.

The cover tubular portion 21 has a substantially cylindrical shape axially extending with the central axis J as a center. The cover tubular portion 21 is open downward. The cover tubular portion 21 surrounds a wall portion 62 of the bus bar assembly 60 to be described later radially from the outside.

The lid portion 22 is located at an upper end of the cover tubular portion 21. The lid portion 22 covers an upper opening of the cover tubular portion 21. The lid portion 22 includes an upper bearing holding portion 22a in the center thereof in plan view. In the present embodiment, the upper bearing holding portion 22a is a recessed portion formed by the cover tubular portion 21 and the lid portion 22. The upper bearing holding portion 22a holds the upper bearing 52 therein. In addition, the upper bearing holding portion 22a has a central hole 22b in the center thereof in plan view (that is, substantially the center of the lid portion 22 in plan view). The central hole 22b axially penetrates the lid portion 22. The central hole 22b allows the shaft 31 to pass therethrough.

The cover flange portion 24 is located at a lower end of the cover tubular portion 21. The cover flange portion 24 extends radially outward from the lower end of the cover tubular portion 21. In addition, the cover flange portion 24 extends in the circumferential direction. In the present embodiment, the cover flange portion 24 has a substantially annular shape in plan view.

The cover tubular portion 21 includes, at its outer edge, a caulking portion 24a extending downward.

That is, the cover member 20 includes the caulking portion 24a. When the cover member 20 is attached to the housing 10 at the opening of the housing 10, the caulking portion 24a is plastically deformed along a lower surface of the flange portion 16 of the housing 10. The cover member 20 is thus fixed to the housing 10.

The rotor 30 is rotatable about the central axis J extending in the up-down direction.

The rotor 30 includes the shaft 31, a rotor core 32, a rotor magnet 33, a sensor magnet holding member 35, and a sensor magnet 34.

The shaft 31 has a columnar shape axially extending with the central axis J as a center. The shaft 31 is rotatably supported by the lower bearing 51 and the upper bearing 52. The shaft 31 has an upper (+Z side) end that protrudes outward through the central hole 22b of the cover member 20 (more specifically, the lid portion 22). Note that, the shaft 31 may be solid or hollow.

The sensor magnet holding member 35 is a substantially annular member. The sensor magnet holding member 35 is fixed to an outer peripheral surface of the shaft 31. The sensor magnet holding member 35 rotates about the central axis J together with the shaft 31. Note that, the sensor magnet holding member 35 is fixed to the outer peripheral surface of the shaft 31 by, for example, press-fitting, adhesion, or the like.

The sensor magnet 34 has a substantially annular shape and N poles and S poles which are alternately disposed in the circumferential direction. The sensor magnet 34 is fixed to a lower surface of the sensor magnet holding member 35. The sensor magnet 34 is fixed to the shaft 31 with the sensor magnet holding member 35 interposed between the sensor magnet 34 and the shaft 31. The sensor magnet 34 rotates about the central axis J together with the shaft 31. The sensor magnet 34 is located lower than the upper bearing 52. In addition, the sensor magnet 34 is located above the circuit board 70. The sensor magnet 34 axially faces a rotation sensor 72 of the circuit board 70. Note that, the sensor magnet 34 is not limited to the above configuration. Alternatively, a plurality of sensor magnets 34 may be provided. In this case, the plurality of sensor magnets 34 are circumferentially disposed. Alternatively, the shape of the sensor magnet is not limited to an annular shape, and may have another shape.

In the present embodiment, the rotor core 32 has a tubular shape extending in the axial direction. The rotor core 32 has a through hole axially penetrating the rotor core 32 and allowing the shaft 31 to pass therethrough. The rotor core 32 is fixed to the outer peripheral surface of the shaft 31. The rotor magnet 33 is held by the rotor core 32. The rotor core 32 and the rotor magnet 33 integrally rotate with the shaft 31. Note that, in the present embodiment, the rotor core 32 is a lamination steel plate in which a plurality of electromagnetic steel plates are stacked. The rotor core 32 may be a dust core. In addition, the rotor magnet may be disposed on an outer peripheral surface of the rotor core 32, or may be partially embedded in and held by the rotor core 32. The rotor core 32 may be directly fixed to the shaft 31 by press-fitting, adhesion, or the like. Alternatively, the rotor core 32 may be indirectly fixed to the shaft 31 by means of a resin member, a metal member, or the like.

The stator 40 is housed in the housing 10. The stator 40 is located radially outside the rotor 30, and radially faces the rotor 30. The stator 40 surrounds the rotor 30 radially from the outside. The stator 40 includes a stator core 41, a plurality of coils 43, an insulator 44, and a relay bus bar 93.

In the present embodiment, the stator core has a tubular shape extending in the axial direction. An outer peripheral surface of the stator core 41 is fitted to the inner peripheral surface 12 of the housing 10. More specifically, the outer peripheral surface of the stator core 41 is fitted to the third inner peripheral region 12C of the inner peripheral surface 12. More preferably, the stator core 41 is fixed to the housing 10 by press-fitting, adhesion, or the like. The stator 40 is thus positioned with respect to the housing 10 and fixed to the housing 10.

The stator core 41 includes a core back portion 41a and a plurality of tooth portions 41b. The core back portion 41a has a substantially annular shape with the central axis J as a center. The tooth portions 41b extend radially inward from an inner surface of the core back portion 41a. The plurality of tooth portions 41b are circumferentially arranged at equal intervals.

In the present embodiment, the coils 43 are each configured by winding a coil wire 43a. The coils 43 are attached to the tooth portions 41b with the insulator 44 interposed between the coils 43 and the tooth portions 41b. The plurality of coils 43 are divided into a U-phase coil, a V-phase coil, and a W-phase coil through which alternating currents having mutual phase differences flow when the motor 1 is driven. The U-phase, V-phase, and W-phase coils 43 are delta-connected to one another by the relay bus bar 93 and a phase bus bar 91 which will be described later. In the present embodiment, for each phase, a set of two coils 43 connected in series is formed into a coil group. In each phase, two coil groups are connected in series by using the relay bus bar 93 to be described later. Note that, the number of coils, the number of the relay bus bars 93, and connection points may be appropriately changed. In addition, the connection method in the stator may be a star connection instead of the delta connection. In this case, the bus bar assembly includes a neutral point bus bar instead of the relay bus bar. In addition, in this case, the neutral point bus bar is connected with the three coil wires 43a respectively extending from the U-phase, V-phase, and W-phase coils 43. Thus, the neutral point bus bar functions as a neutral point connecting the U-phase, V-phase, and W-phase coils.

The insulator 44 is attached to the tooth portions 41b. The insulator 44 is interposed between the coils 43 and the tooth portions 41b. The insulator 44 is made of a material having an insulating property. In the present embodiment, the insulator 44 is a resin having an insulating property. The insulator 44 ensures insulation between the coils 43 and the tooth portions 41b.

The relay bus bar 93 is a conductive member. In the present embodiment, the relay bus bar 93 is made of a conductive metal. The relay bus bar 93 is supported by the insulator 44 above the stator core 41. The relay bus bar 93 extends in the circumferential direction. As described above, the relay bus bar 93 connects the two coil groups connected in series to each other.

The circuit board 70 includes a control unit that controls the current flowing to the stator 40.

The circuit board 70 is preferably disposed along a plane substantially perpendicular to the axial direction. The circuit board 70 is held by the bracket 61 of the bus bar assembly 60 to be described later. The circuit board 70 includes a board body 71 and a plurality of rotation sensors 72 mounted on the board body 71.

In the present embodiment, the board body 71 is a rigid board extending along a plane perpendicular to the axial direction. The board body 71 extends in an arch-shaped manner about the central axis J. The board body 71 allows the shaft 31 to pass through a radial inside thereof. The board body 71 is axially located between the stator 40 and the cover member 20. The board body 71 is provided with printed wiring (not illustrated).

Figure 3:
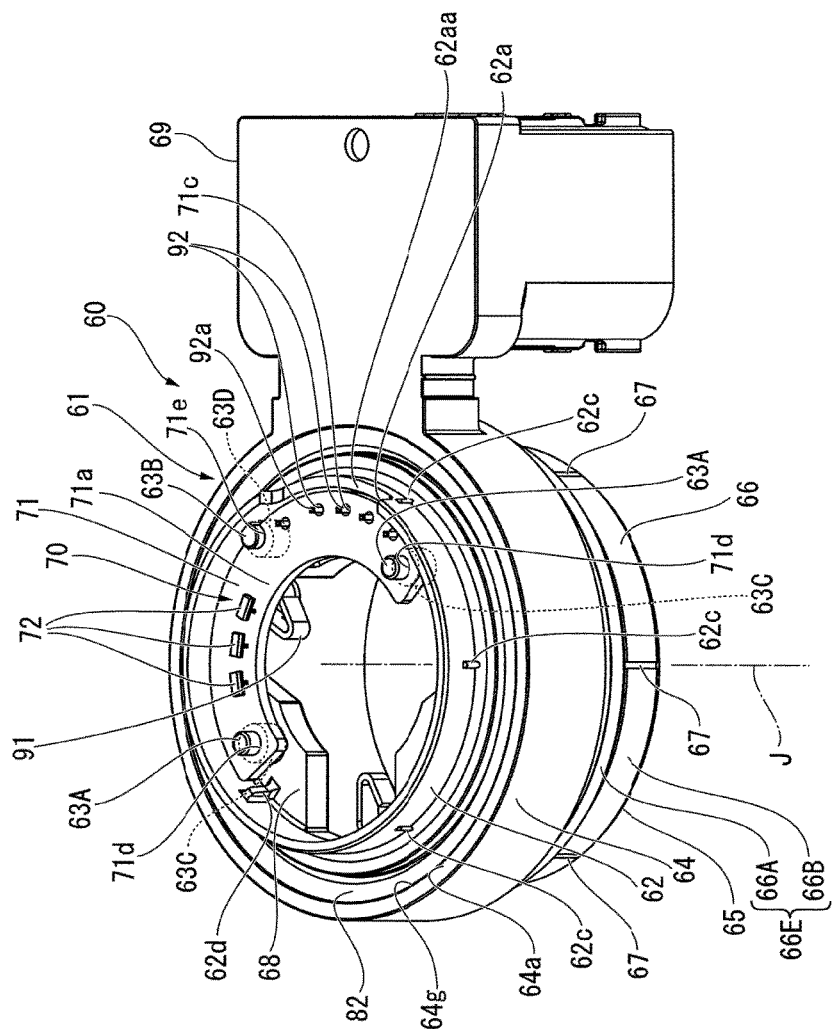
FIG. 3 is a perspective view of a bus bar assembly and a circuit board according to one embodiment.
Figure 4:
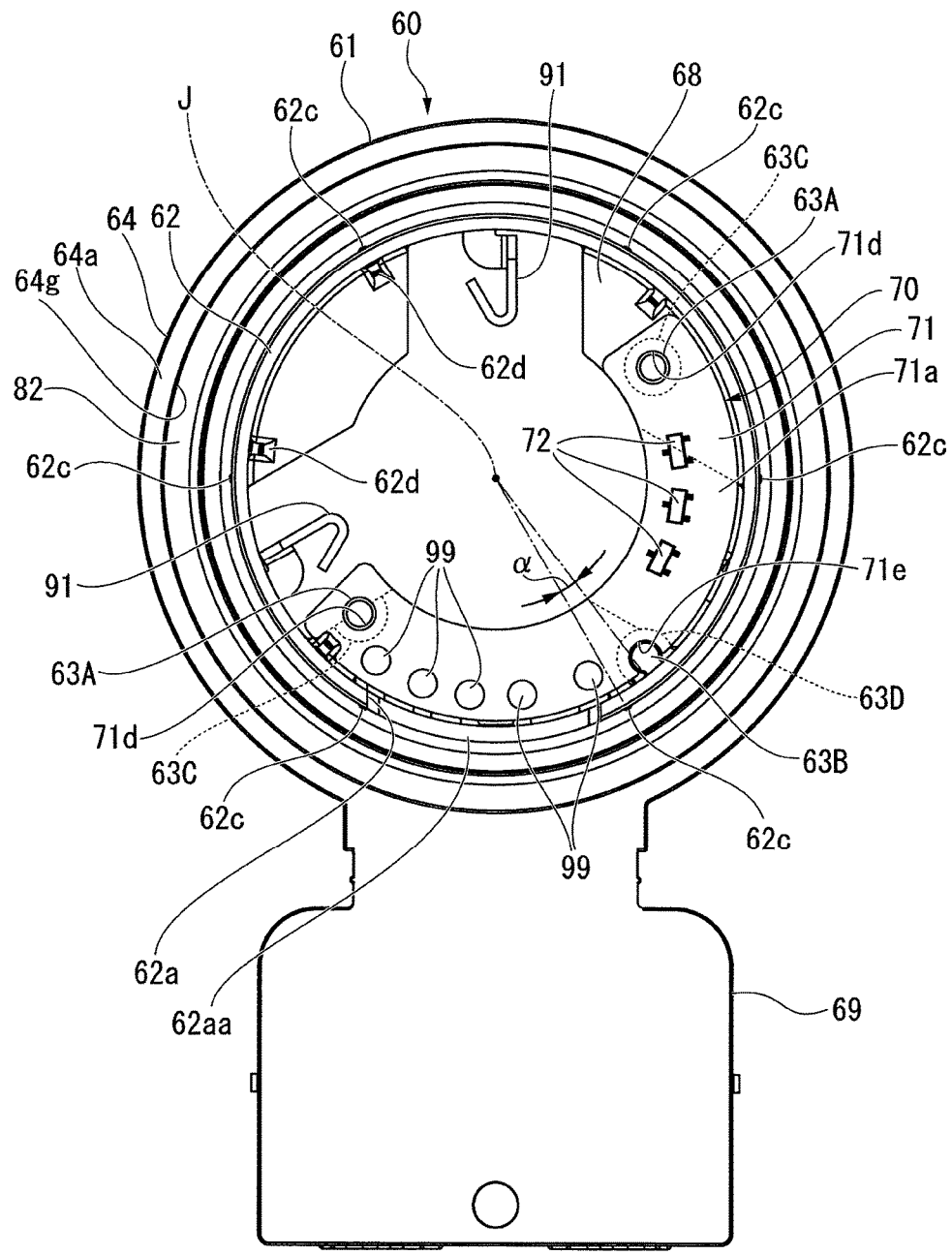
FIG. 4 is a plan view of the bus bar assembly and the circuit board according to one embodiment.

FIG. 3 is a perspective view of the bus bar assembly 60 and the circuit board 70. FIG. 4 is a plan view of the bus bar assembly 60 and the circuit board 70.

As illustrated in FIG. 3, the board body 71 has a plurality of (five in the present embodiment) terminal connection holes 71c and a plurality of (three in the present embodiment) positioning holes 71d and 71e. That is, the circuit board 70 has the terminal connection holes 71c and the positioning holes 71d and 71e. The terminal connection holes 71c and the positioning holes 71d and 71e axially penetrate the board body 71. The terminal connection holes 71c each allow a connection terminal 92a of a signal bus bar 92 to be described later to be inserted therethrough. Meanwhile, the positioning holes 71d and 71e allow positioning pins 63A and 63B of the bracket 61 to be described later to be respectively inserted therethrough.

The three positioning holes 71d and 71e are divided into two first positioning holes 71d and one second positioning hole 71e. The first positioning holes 71d each have a substantially circular shape in plan view. In addition, the second positioning hole 71e is a cutout that is open at an outer edge of the circuit board 70. Thus, the second positioning hole 71e is open not only in the up-down direction but also outward in the radial direction.

The rotation sensors 72 are attached to an upper surface 71a of the board body 71. In the present embodiment, each rotation sensor 72 is a Hall element. In the present embodiment, the circuit board 70 is provided with three rotation sensors 72. The three rotation sensors 72 are circumferentially arranged. The rotation sensors 72 axially face the sensor magnet 34. The rotation sensors 72 detect a change in magnetic flux resulting from rotation of the sensor magnet 34 about the central axis J. Note that, each rotation sensor 72 may be another type of sensor such as a magnetoresistive element. When the rotation sensor 72 is a magnetoresistive element, the number of rotation sensors 72 may be only one, or may be two or more.

The bus bar assembly 60 is located above the stator 40. The bus bar assembly 60 has a substantially annular shape in plan view. The bus bar assembly 60 has a through hole extending radially therein. The through hole allows the shaft 31 to pass therethrough.

The bus bar assembly 60 includes the bracket 61 and a plurality of bus bars. In the present embodiment, the plurality of bus bars are divided into a plurality of (three in the present embodiment) phase bus bars (bus bars) 91 and a plurality of (five in the present embodiment) signal bus bars (bus bars) 92. That is, the motor 1 includes the bracket 61, the phase bus bars 91, and the signal bus bars 92. The bus bars, that is, the plurality of phase bus bars 91 and the plurality of signal bus bars 92 are conductive members. In the present embodiment, the phase bus bars 91 and the signal bus bars 92 are each made of a conductive metal. The phase bus bars 91 and the signal bus bars 92 are embedded in the bracket 61 by insert molding, for example. That is, the phase bus bars 91 and the signal bus bars 92 are held by the bracket 61.

The phase bus bars 91 electrically connect an external device (not illustrated) with the stator 40, and supply the stator 40 with a drive current supplied from the external device. The three phase bus bars 91 of the present embodiment are respectively connected to the coil wires 43a drawn from the coils 43 of the U phase, the V phase, and the W phase. The drive current supplied to the coils 43 through the phase bus bars 91 is controlled in accordance with a rotation angle of the rotor 30, the rotation angle being calculated based on values detected by the rotation sensors 72, for example. When the drive current is supplied to the coils 43, a magnetic field is generated in the stator 40, and the magnetic interaction between the stator 40 and the rotor 30 causes the rotor 30 including the shaft 31 to rotate.

In the present embodiment, each of the phase bus bars 91 is partially embedded in and held by the bracket 61. Each phase bus bar 91 has a first end that is exposed from the bracket 61 and is connected to a corresponding one of the coil wires 43a. Each phase bus bar 91 has a second end that is exposed inside a downward opening (not illustrated) provided in a connector portion 69 of the bracket 61. The second end, exposed inside the connector portion 69, of the phase bus bar 91 is connected with an external device (not illustrated).

The signal bus bars 92 electrically connect an external device (not illustrated) with the circuit board 70. In the present embodiment, each of the signal bus bars 92 is partially embedded in and held by the bracket 61. Each signal bus bar 92 has a first end and includes a connection terminal 92a exposed from the bracket 61 at the first end. The connection terminal 92a is connected to the circuit board 70. Thus, the signal bus bars 92 are electrically connected to the rotation sensors 72 of the circuit board 70 through the printed wiring of the circuit board 70. Each signal bus bar 92 has a second end that is exposed inside the downward opening (not illustrated) provided in the connector portion 69 of the bracket 61. The second end, exposed inside the connector portion 69, of the signal bus bar 92 is connected with an external device (not illustrated).

Figure 5:
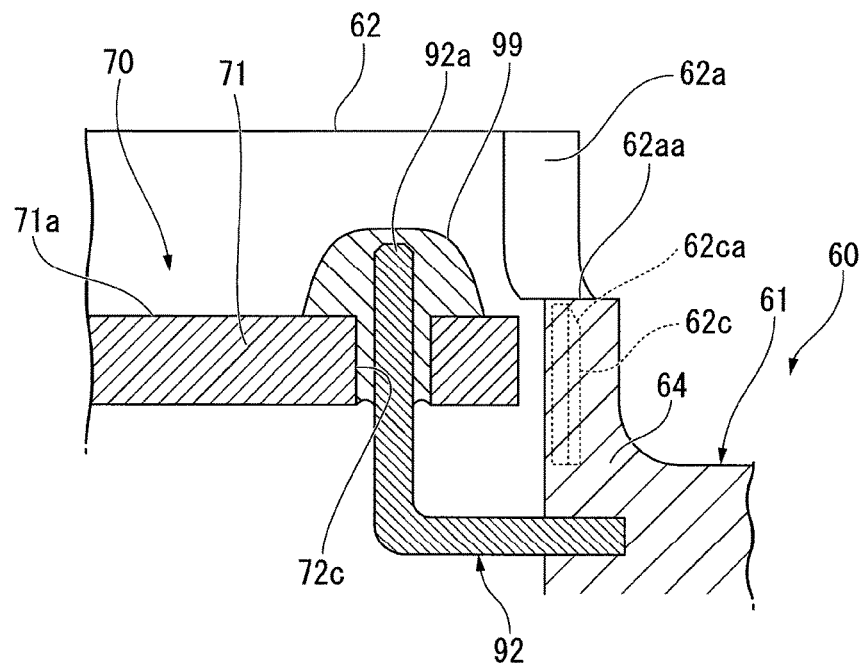
FIG. 5 is a cross-sectional view of a terminal connection portion according to one embodiment.

FIG. 5 is a cross-sectional view illustrating a connection structure between the connection terminal 92a of each signal bus bar 92 and the circuit board 70.

As illustrated in FIG. 5, the connection terminal 92a and the circuit board 70 are connected to each other at a terminal connection portion 99. That is, the signal bus bar 92 is connected to the circuit board 70 at the terminal connection portion 99. Note that, the terminal connection portion 99 is not illustrated in FIG. 3.

The connection terminal 92a is inserted through the terminal connection hole 71c such that the connection terminal 92a extends from a lower side toward an upper side of the board body 71. A distal end of the connection terminal 92a protrudes upward to be higher than the board body 71. The terminal connection portion 99 is located on the upper surface 71a of the circuit board 70. The terminal connection portion 99 electrically connects the connection terminal 92a with the printed wiring (not illustrated) of the circuit board 70. In the present embodiment, the terminal connection portion 99 is a solder portion. The terminal connection portion 99 is provided in such a manner that the melted solder is supplied from above using a soldering tool, such as a soldering iron, in a state where the connection terminal 92a is inserted through the terminal connection hole 71c. In the present embodiment, the terminal connection portion 99 has a shape that bulges upward to be higher than the upper surface 71a of the circuit board 70.

As illustrated in FIG. 1, the bracket 61 is located above the stator 40.

Moreover, the bracket 61 is located below the cover member 20. The bracket 61 is made of, for example, a resin. The bracket 61 holds the phase bus bars 91, the signal bus bars 92, and the circuit board 70.

As illustrated in FIG. 3, the bracket 61 includes a body portion 64, a board support portion 68, the wall portion 62, an insertion tubular portion 65, and the connector portion 69. The body portion 64 has a substantially annular shape with the central axis J as a center. The wall portion 62 is located above the body portion 64. The wall portion 62 surrounds the central axis. The insertion tubular portion 65 is located below the body portion 64. The board support portion 68 protrudes radially inward from an inner peripheral surface of the body portion 64. The connector portion 69 extends radially outward from the body portion 64. The connector portion 69 is connected with, for example, a socket (not illustrated) of an external device (not illustrated).

As illustrated in FIG. 2, the body portion 64 is disposed radially inside the housing tubular portion 11 of the housing 10. The body portion 64 has an outer peripheral surface that faces radially outward. The outer peripheral surface radially faces the upper end inner peripheral region 12D of the inner peripheral surface 12 of the housing tubular portion 11. Each phase bus bar 91 and each signal bus bar 92 are partially embedded in the body portion 64. The outer peripheral surface, which faces radially outward, of the body portion 64 may be in radial contact with the upper end inner peripheral region 12D of the inner peripheral surface 12 of the housing tubular portion 11.

The body portion 64 has an upper surface 64a that is in axial contact with a lower surface 24b of the cover flange portion 24 of the cover member 20. The upper surface 64a of the body portion 64 has a recessed groove 64g extending in the circumferential direction. That is, the upper surface 64a of the bracket 61 has the recessed groove 64g. The recessed groove 64g has a substantially annular shape with the central axis J as a center in plan view. The recessed groove 64g receives an upper O-ring 82 therein. The upper O-ring 82 has a substantially annular shape. The upper O-ring 82 extends in the circumferential direction. The upper O-ring 82 has, for example, a substantially circular cross-sectional shape. The upper O-ring 82 is in contact with the lower surface of the cover flange portion 24. In addition, in the inside of the recessed groove 64g, the upper O-ring 82 is in contact with a bottom surface of the recessed groove 64g and a radially inward facing surface of the recessed groove 64g. The upper O-ring 82 is interposed between the upper surface 64a of the bracket 61 and the lower surface 24b of the cover flange portion 24. The upper O-ring 82 is sandwiched between the bracket 61 and the cover flange portion 24 to be compressed from both axial sides thereof. Thus, the upper O-ring 82 prevents or reduces the entry of water or the like into the motor 1 from an area between the bracket 61 and the cover member 20. Note that, the cross-sectional shape of the upper O-ring 82 is not limited to the circular shape, and may be, but not particularly limited to, a polygonal shape or an elliptical shape. In addition, in the inside of the recessed groove 64g, the upper O-ring 82 may be in contact with the bottom surface of the recessed groove 64g and at least one of the radially inward facing surface and a radially outward facing surface of the recessed groove 64g.

As illustrated in FIG. 3, the board support portion 68 has a plate shape extending along a plane substantially perpendicular to the axial direction. The board support portion 68 is disposed radially inside the body portion 64. The board support portion 68 supports the circuit board 70 from below.

The board support portion 68 includes a plurality of (three in the present embodiment) base portions 63C and 63D and a plurality of (three in the present embodiment) positioning pins 63A and 63B. The three base portions 63C and 63D are divided into two first base portions 63C and one second base portion 63D. Similarly, the three positioning pins 63A and 63B are divided into two first positioning pins 63A and one second positioning pin 63B. The first positioning pins 63A protrude from upper surfaces of the first base portions 63C. Meanwhile, the second positioning pin 63B protrudes from an upper surface of the second base portion 63D. The first base portions 63C and the first positioning pins 63A are disposed at a distance radially inward from an inner peripheral surface of the wall portion 62. Meanwhile, the second base portion 63D and the second positioning pin 63B are continuous with the inner peripheral surface of the wall portion 62.

The base portions 63C and 63D are located on an upper surface of the board support portion 68 and protrude upward to be higher than the upper surface. In the present embodiment, the base portions 63C and 63D are columnar protrusions. The plurality of base portions 63C and 63D are arranged along the inner peripheral surface of the wall portion 62.

The upper surfaces of the base portions 63C and 63D are flat surfaces that are substantially perpendicular to the axial direction. The upper surfaces of the base portions 63C and 63D are in contact with a lower surface of the circuit board 70. The board support portion 68 supports the circuit board 70 on the upper surfaces of the base portions 63C and 63D. Note that, the base portions 63C and 63D are not necessarily limited to the columnar protrusions, and may be protrusions having other shapes such as a polygonal prism shape. The base portions 63C and 63D may be hollow.

According to the present embodiment, the circuit board 70 is supported on the upper surfaces of the base portions 63C and 63D, the upper surfaces being flat surfaces substantially perpendicular to the axial direction. Thus, the circuit board 70 can be disposed with high accuracy along a plane substantially perpendicular to the central axis J.

The board support portion 68 of the present embodiment supports the circuit board 70 by means of the plurality of base portions 63C and 63D which are discretely disposed. Thus, the board support portion 68 prevents or reduces a rattling of the circuit board 70 even when the circuit board 70 is warped, as compared with a case where the circuit board 70 is supported by one surface having a large area. In addition, mounted components (such as electronic components) can be disposed in a region of a lower surface of the board body 71, the region being not in contact with the base portions 63C and 63D.

The plurality of positioning pins 63A and 63B are arranged along the inner peripheral surface of the wall portion 62.

The positioning pins 63A and 63B are inserted through the positioning holes 71d and 71e provided in the circuit board 70. More specifically, the first positioning pins 63A are inserted through the first positioning holes 71d, and the second positioning pin 63B is inserted through the second positioning hole 71e. The positioning pins 63A and 63B each have an upper end that protrudes upward to be higher than the upper surface 71a of the board body 71.

According to the present embodiment, with the plurality of positioning pins 63A and 63B being inserted through the positioning holes 71d and 71e, the circuit board 70 can easily be positioned with respect to the bracket 61 in the substantially horizontal direction. In addition, according to the present embodiment, since the plurality of positioning pins 63A and 63B are arranged along the inner peripheral surface of the wall portion 62, the circumferential positioning accuracy of the circuit board 70 with respect to the bracket 61 can be increased.

In the present embodiment, the first positioning pins 63A each have a substantially columnar shape. Each first positioning pin 63A has an outside diameter that is smaller than an inside diameter of each first positioning hole 71d. Note that, the shape of each first positioning pin 63A is not limited to the columnar shape, and may be other shapes such as a polygonal prism shape.

Figure 6:
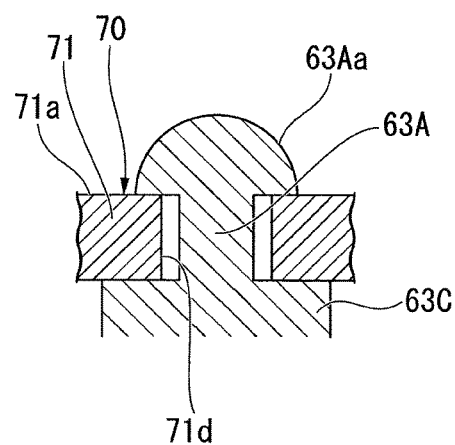
FIG. 6 is a schematic cross-sectional view of a first positioning pin according to one embodiment.

FIG. 6 is a schematic cross-sectional view of the first positioning pin 63A.

As illustrated in FIG. 6, the first positioning pin 63A has, at its top, a welded portion 63Aa. Note that, the welded portion 63Aa is not provided at the top of the second positioning pin 63B. The welded portion 63Aa is shaped in a thermal caulking process. That is, the welded portion 63Aa is shaped when the top of the first positioning pin 63A is melted and solidified again.

Note that, the welded portion 63Aa is not illustrated in FIGS. 3 and 4.

In the present embodiment, the welded portion 63Aa has a substantially hemispherical shape that protrudes upward. The welded portion 63Aa covers the first positioning hole 71d in plan view. The welded portion 63Aa is in contact with the upper surface 71a of the board body 71. The welded portion 63Aa prevents or reduces separation of the circuit board 70 from the bracket 61.

As illustrated in FIG. 4, the second positioning pin 63B and the second base portion 63D each have a shape continuous with the inner peripheral surface of the wall portion 62. That is, the second positioning pin 63B and the second base portion 63D each have an outer surface that is oriented in the direction perpendicular to the axial direction and continuously connected to the inner peripheral surface of the wall portion 62.

According to the present embodiment, the second positioning pin 63B and the second base portion 63D function as ribs that reinforce the wall portion 62. Thus, it is possible to prevent or reduce deformation of the wall portion 62 owing to sink marks during molding of the bracket 61.

As illustrated in FIG. 3, the wall portion 62 has a substantially cylindrical shape with the central axis J as a center.

That is, the wall portion 62 surrounds the central axis J. The wall portion 62 protrudes upward from the body portion 64. That is, the wall portion 62 protrudes upward to be higher than the board support portion 68. The inner peripheral surface of the wall portion 62 is axially continuous with the inner peripheral surface of the body portion 64. The wall portion 62 surrounds the circuit board 70. That is, the circuit board 70 is disposed radially inside the wall portion 62.

As illustrated in FIG. 2, the wall portion 62 is inserted into the cover tubular portion 21 of the cover member 20. The wall portion 62 has an outer peripheral surface whose outside diameter is smaller than an inside diameter of an inner peripheral surface of the cover tubular portion 21. The outer peripheral surface of the wall portion 62 radially faces the inner peripheral surface of the cover tubular portion 21. The outer peripheral surface of the wall portion 62 functions as a guide when the wall portion 62 is inserted into the cover tubular portion 21. According to the present embodiment, the provision of the wall portion 62 facilitates alignment of the cover member 20 with respect to the bracket 61.

Note that in the present embodiment, the description has been given of the case where the outer peripheral surface of the wall portion 62 and the inner peripheral surface of the cover tubular portion 21 are substantially circular in plan view. However, the shapes of the outer peripheral surface of the wall portion 62 and the inner peripheral surface of the cover tubular portion 21 are not limited as long as the wall portion 62 can be inserted into the cover tubular portion 21.

In addition, the term "tubular portion" as used herein refers to a concept involving, for example, a rectangular tubular shape rather than a concept limited to a cylindrical shape which is circular in plan view.

As illustrated in FIG. 3, the wall portion 62 has a cutout portion 62a extending downward from an upper end of the wall portion 62. The cutout portion 62a has a bottom surface 62aa facing upward. The bottom surface 62aa extends in an arch-shaped manner in the circumferential direction.

As illustrated in FIG. 5, the terminal connection portion 99 is provided on the upper surface of the circuit board 70 and connects the signal bus bar 92 and the board body 71. In the present embodiment, the terminal connection portion 99 is a solder portion. A worker inserts the soldering iron through the cutout portion 62a when soldering the signal bus bar 92 and the board body 71. According to the present embodiment, the provision of the cutout portion 62a in the wall portion 62 allows the worker to easily bring the soldering iron close to the upper surface 71a of the circuit board 70. This facilitates the connecting step of connecting the signal bus bar 92 and the circuit board 70. Thus, the workability in the connecting step can be increased.

The bottom surface 62aa of the cutout portion 62a is located lower than an upper end of the terminal connection portion 99. Consequently, in the connecting step, the soldering iron is more easily brought close to the terminal connection portion 99 by being inserted through the cutout portion 62a. Thus, the workability in the connecting step of connecting the signal bus bar 92 and the circuit board 70 can be further increased.

As illustrated in FIG. 4, the terminal connection portions 99 and the cutout portion 62a are located to circumferentially coincide with each other. Consequently, the worker can bring the soldering iron close to the terminal connection portions 99, through the cutout portion 62a, radially from an outside of the substantially cylindrical wall portion 62. Thus, according to the present embodiment, the workability in the connecting step of connecting the signal bus bar 92 and the circuit board 70 can be further increased.

Note that in the present embodiment, the description has been given of the case where the terminal connection portion that connects the signal bus bar 92 and the circuit board 70 is the solder portion. However, the terminal connection portion may have another structure. As an example, the terminal connection portion may have a press-fit structure. In this case, the connection terminal of the signal bus bar is a press-fit pin. The pre-fit pin is press-fitted into the terminal connection hole provided in the board body, thus connecting the signal bus bar and the circuit board. When the press-fit structure is adopted as the terminal connection portion, in the connecting step, the circuit board is pressed downward around the terminal connection hole by using a jig, and the connection terminal, which is the press-fit pin, is press-fitted into the terminal connection hole. Thus, the provision of the cutout portion in the wall portion achieves a reduction in the interference between the wall portion and the jig.

As described above, when the wall portion 62 surrounding the circuit board 70 is provided on the bracket 61, the wall portion 62 may reduce the workability in the connecting step of connecting the signal bus bar 92 and the circuit board 70. The provision of the cutout portion 62a in the wall portion 62 facilitates the connecting step of connecting the signal bus bar 92 and the circuit board 70 at the terminal connection portion regardless of the configuration of the terminal connection portion.

As illustrated in FIG. 3, the wall portion 62 has an outer surface provided with a plurality of first ribs 62c. The first ribs 62c axially extend upward from the upper surface 64a of the body portion 64. The first ribs 62c are circumferentially arranged at equal intervals. In the present embodiment, the wall portion 62 has six first ribs 62c. It is preferable that three or more first ribs 62c are provided on the wall portion 62.

As illustrated in FIG. 2, each first rib 62c is in contact with an inner surface of the cover tubular portion 21. Thus, the plurality of first ribs 62c radially align the cover tubular portion 21 with respect to the bracket 61. That is, according to the present embodiment, by inserting the wall portion 62 into the cover tubular portion 21, the wall portion 62 can be substantially concentric with the cover tubular portion 21.

A diameter of a virtual circle connecting radially outer ends of the plurality of first ribs 62c is larger than the inside diameter of the inner peripheral surface of the cover tubular portion 21 in a state before the wall portion 62 is inserted into the cover tubular portion 21. The insertion of the wall portion 62 into the cover tubular portion 21 causes the first ribs 62c to elastically deform. Thus, the step of inserting the wall portion 62 into the cover tubular portion 21 is a press-fitting step. According to the present embodiment, it is possible to prevent or reduce the displacement of the cover member 20 with respect to the bracket 61, thus increasing the positioning accuracy of the cover member 20 with respect to the bracket 61. Note that, the first ribs 62c may elastically deform and, at the same time, plastically deform.

In the present embodiment, the cover member 20 supports the upper bearing 52. Thus, by increasing the positioning accuracy of the cover member 20, it is possible to increase the accuracy of position of the upper bearing 52 and the efficiency of rotation of the shaft 31 supported by the upper bearing 52.

As illustrated in FIG. 5, it is preferable that each first rib 62c has an upper end portion provided with a tapered surface 62ca tapered upward toward the central axis J. The provision of the tapered surface 62ca at the upper end portion of the first rib 62c allows the wall portion 62 to be inserted into the cover tubular portion 21 without the upper end portion of the first rib 62c being caught by the cover tubular portion 21. This facilitates an assembling step.

An upper end of the first rib 62c is located lower than the upper end of the wall portion 62. As described above, the wall portion 62 has the cutout portion 62a extending downward from the upper end of the wall portion 62.

Thus, in the wall portion 62, a strength near the upper end is lower than a strength near a lower end. Since the first rib 62c receives a radially inward stress from the cover tubular portion 21 (see FIG. 2), the first rib 62c reaching the upper end of the wall portion 62 may cause damage to a portion near the upper end of the wall portion 62. According to the present embodiment, since the upper end of the first rib 62c is located lower than the upper end of the wall portion 62, it is possible to prevent or reduce damage to the wall portion 62 which is caused when a radially inward stress is applied onto the first rib 62c.

In the present embodiment, the upper end of the first rib 62c is located lower than the bottom surface 62aa of the cutout portion 62a. In the wall portion 62, a strength of a region where the cutout portion 62a is axially provided is lower than a strength of a region located lower than the cutout portion 62a. According to the present embodiment, it is possible to further prevent or reduce damage to the wall portion 62 which is caused when a radially inward stress is applied onto the first rib 62c.

Note that, the upper end of the first rib 62c may be located to axially coincide with the bottom surface 62aa of the cutout portion 62a. Even in this case, the advantageous effects described above can be obtained. That is, the upper end of the first rib 62c is located lower than the bottom surface 62aa of the cutout portion 62a, or located to axially coincide with the bottom surface 62aa of the cutout portion 62a.

Referring now to FIG. 4, a description will be given of a relationship between the second positioning pin 63B and second base portion 63D and the first rib 62c. As described above, the outer surfaces of the second positioning pin 63B and the second base portion 63D are continuously connected to the inner peripheral surface of the wall portion 62. That is, the second positioning pin 63B and the second base portion 63D reinforce the wall portion 62. Thus, the second positioning pin 63B and the second base portion 63D prevent or reduce damage to the wall portion 62 which is caused when a radially inward stress is applied onto the first rib 62c.

Note that, the inner peripheral surface of the wall portion 62 is provided with a plurality of second ribs 62d that are circumferentially arranged, in addition to the second positioning pin 63B and the second base portion 63D. The second ribs 62d reinforce the wall portion 62 together with the second positioning pin 63B and the second base portion 63D.

In the present embodiment, the second positioning pin 63B is located near the first rib 62c. More specifically, it is preferable that an angle α defined by a straight line connecting the second positioning pin 63B and the central axis J and a straight line connecting the first rib 62c and the first rib 62c is approximately 10° or less. That is, it is preferable that the second positioning pin 63B and the first rib 62c are disposed within an angular range of approximately 10° about the central axis J. By disposing the second positioning pin 63B and the first rib 62c in this way, it is possible to effectively prevent or reduce damage to the wall portion 62 which is caused when a radially inward stress is applied onto the first rib 62c.

In the present embodiment, the upper end of the second positioning pin 63B is located higher than the upper end of the first rib 62c. Thus, it is possible to effectively prevent or reduce damage to the wall portion 62 which is caused when a radially inward stress is applied onto the first rib 62c.

Note that, the upper end of the second positioning pin 63B may be located to axially coincide with the upper end of the first rib 62c. Even in this case, the advantageous effects described above can be obtained. That is, the upper end of the second positioning pin 63B may be located higher than the upper end of the first rib 62c, or located to axially coincide with the upper end of the first rib 62c.

As illustrated in FIG. 2, the insertion tubular portion 65 extends downward from the body portion 64. The insertion tubular portion 65 has a substantially cylindrical shape axially extending with the central axis J as a center.

The insertion tubular portion 65 is inserted radially between the stator 40 and the inner peripheral surface 12 of the housing tubular portion 11.

The insertion tubular portion 65 has an outer peripheral surface 66 that faces radially outward. The outer peripheral surface 66 is divided into a plurality of regions that are axially arranged and have different outside diameters. The outer peripheral surface 66 has an upper end outer peripheral region 66C, an intermediate outer peripheral region 66D, and a lower end outer peripheral region 66E. The upper end outer peripheral region 66C, the intermediate outer peripheral region 66D, and the lower end outer peripheral region 66E are disposed in this order from top to bottom. The upper end outer peripheral region 66C, the intermediate outer peripheral region 66D, and the lower end outer peripheral region 66E respectively have outside diameters that are gradually smaller in this order.

In the present embodiment, the upper end outer peripheral region 66C is substantially circular when viewed in the axial direction.

The upper end outer peripheral region 66C is axially continuous with the outer peripheral surface of the body portion 64. The upper end outer peripheral region 66C radially faces the upper end inner peripheral region 12D of the housing tubular portion 11. The outside diameter of the upper end outer peripheral region 66C is smaller than the inside diameter (fourth inside diameter D4) of the upper end inner peripheral region 12D. Thus, a minute gap is radially defined between the upper end outer peripheral region 66C and the upper end inner peripheral region 12D.

In the present embodiment, the intermediate outer peripheral region 66D is substantially circular when viewed in the axial direction.

The intermediate outer peripheral region 66D radially faces the first inner peripheral region 12A of the housing tubular portion 11. The outside diameter of the intermediate outer peripheral region 66D is smaller than the inside diameter (first inside diameter D1) of the first inner peripheral region 12A. Thus, a gap is defined between the intermediate outer peripheral region 66D and the first inner peripheral region 12A.

A second shoulder surface 66b is interposed between the intermediate outer peripheral region 66D and the upper end outer peripheral region 66C. That is, the outer peripheral surface 66 of the insertion tubular portion 65 has the second shoulder surface 66b. The second shoulder surface 66b faces downward. The second shoulder surface 66b extends radially outward from an upper end of the intermediate outer peripheral region 66D. In addition, the second shoulder surface 66b extends in the circumferential direction.

The second shoulder surface 66b is in axial contact with a third shoulder surface 12a provided on the inner peripheral surface 12 of the housing tubular portion 11. The third shoulder surface 12a is interposed between the first inner peripheral region 12A and the upper end inner peripheral region 12D of the inner peripheral surface 12. That is, the inner peripheral surface 12 of the housing tubular portion 11 has the third shoulder surface 12a. The third shoulder surface 12a faces upward. The third shoulder surface 12a extends radially outward from an upper end of the first inner peripheral region 12A.

According to the present embodiment, the contact of the second shoulder surface 66b of the insertion tubular portion 65 with the third shoulder surface 12a of the housing tubular portion 11 facilitates the axial positioning of the bracket 61 with respect to the housing 10.

The lower end outer peripheral region 66E has a first outer peripheral region 66A and a second outer peripheral region 66B. That is, the outer peripheral surface 66 of the insertion tubular portion 65 has the first outer peripheral region 66A and the second outer peripheral region 66B. The first outer peripheral region 66A and the second outer peripheral region 66B are axially arranged. The second outer peripheral region 66B is located lower than the first outer peripheral region 66A.

The first outer peripheral region 66A is substantially circular when viewed in the axial direction. The first outer peripheral region 66A radially faces the first inner peripheral region 12A of the housing tubular portion 11. The first outer peripheral region 66A has an outside diameter that is sufficiently smaller than the inside diameter (first inside diameter D1) of the first inner peripheral region 12A. Thus, a gap is defined between the first outer peripheral region 66A and the first inner peripheral region 12A.

The lower O-ring 81 is disposed between the first outer peripheral region 66A and the first inner peripheral region 12A. The lower O-ring 81 has a substantially annular shape. The lower O-ring 81 extends in the circumferential direction. The lower O-ring 81 has a substantially circular cross-sectional shape. The lower O-ring 81 is sandwiched between the first outer peripheral region 66A and the first inner peripheral region 12A to be compressed. Accordingly, the lower O-ring 81 prevents or reduces the entry of water or the like into the motor 1 from an area between the bracket 61 and the housing 10. Note that, the cross-sectional shape of the lower O-ring 81 is not limited to the circular shape, and may be, but not particularly limited to, a polygonal shape including a rectangular shape or an elliptical shape.

The lower O-ring 81 and the upper O-ring 82 of the present embodiment have the same shape. The lower O-ring 81 is in contact with the first inner peripheral region 12A radially from inside. On the other hand, the upper O-ring 82 is in contact with the radially inward facing surface of the recessed groove 64g radially from inside. The first inner peripheral region 12A has the inside diameter substantially equal to that of the radially inward facing surface of the recessed groove 64g. Thus, in the radial direction, a distance from the central axis J to the lower O-ring 81 can be substantially the same as a distance from the central axis J to the upper O-ring 82. In addition, in the present embodiment, a diameter of the lower O-ring 81 is equal to that of the upper O-ring 82 before their deformation.

According to the present embodiment, since the lower O-ring 81 and the upper O-ring 82 have the same shape, the motor 1 only needs to have one type of O-ring without need to use two types of O-rings. Thus, the number of types of the parts of the motor 1 can be reduced. In addition, since the lower O-ring 81 and the upper O-ring 82 have the same shape, in the assembling step, a worker and the like do not need to distinguish the upper O-ring 82 from the lower O-ring 81 when placing them in position. Thus, the assembling step can be simplified.

A first shoulder surface 66a is interposed between the lower end outer peripheral region 66E and the intermediate outer peripheral region 66D. That is, the outer peripheral surface 66 of the insertion tubular portion 65 has the first shoulder surface 66a. The first shoulder surface 66a faces downward. The first shoulder surface 66a extends radially outward from the upper end of the first outer peripheral region 66A. In addition, the first shoulder surface 66a extends in the circumferential direction. The lower O-ring 81 is in contact with the first shoulder surface 66a from below.

According to the present embodiment, in the assembling step of inserting the insertion tubular portion 65 into the housing tubular portion 11, the lower O-ring 81 comes into contact with the first shoulder surface 66a and is limited in its upward movement. That is, according to the present embodiment, the provision of the first shoulder surface 66a facilitates the axial positioning of the lower O-ring 81.

The second outer peripheral region 66B radially faces the second inner peripheral region 12B of the housing tubular portion 11. The second outer peripheral region 66B and the second inner peripheral region 12B are fitted to each other.

This facilitates the radial positioning of the bracket 61 with respect to the housing 10.

The outer peripheral surface 66 of the insertion tubular portion 65 is fitted to the housing tubular portion 11 in the second outer peripheral region 66B located lower than the first outer peripheral region 66A that compresses the lower O-ring 81. In the assembling step of the motor 1, the insertion tubular portion 65 is inserted into the housing 10 with the lower O-ring 81 attached to the first outer peripheral region 66A. Since the second outer peripheral region 66B is located lower than the lower O-ring 81, the second outer peripheral region 66B comes into contact with the inner peripheral surface 12 of the housing tubular portion 11 before the lower O-ring 81 comes into contact with the housing tubular portion 11. Thus, the bracket 61 is radially aligned with respect to the housing 10 at the time of starting the contact of the lower O-ring 81 with the housing tubular portion 11. As a result, it is possible to prevent or reduce nibbling and twisting of the lower O-ring 81 in the assembling step.

As illustrated in FIG. 2, a first length h1 represents an axial distance from the upper end of the first inner peripheral region 12A to a lower end of a contact portion between the lower O-ring 81 and the first inner peripheral region 12A. In addition, a second length h2 represents an axial fitting length between the second inner peripheral region 12B and the second outer peripheral region 66B.

The first length h1 represents a distance by which the lower O-ring 81 moves while being in contact with the inner peripheral surface 12 of the housing tubular portion 11 in the assembling step. In addition, the second length h2 represents a distance by which the second outer peripheral region 66B moves while being in contact with the inner peripheral surface 12 of the housing tubular portion 11 in the assembling step.

In the present embodiment, the first length h1 is less than the second length h2. Thus, in the assembling step, the second outer peripheral region 66B comes into contact with the inner peripheral surface 12 before contacting the lower O-ring 81. That is, in the assembling step, at the time when the lower O-ring 81 comes into contact with the inner peripheral surface 12, the second outer peripheral region 66B has already been in contact with the inner peripheral surface 12 and the bracket 61 has already been radially aligned with the housing 10. According to the present embodiment, it is possible to more reliably prevent or reduce nibbling and twisting of the lower O-ring 81.

As illustrated in FIG. 3, the second outer peripheral region 66B has six protrusions 67 circumferentially arranged. Each protrusion 67 protrudes radially outward in the second outer peripheral region 66B. The protrusion 67 axially extends from a lower end to an upper end of the second outer peripheral region 66B. In the present embodiment, the protrusion 67 axially extends in a rib-shaped manner. A radially outer end of the protrusion 67 is continuous with the first outer peripheral region 66A. That is, a diameter of a virtual circle connecting the radially outer ends of the protrusions 67 is equal to the outside diameter of the first outer peripheral region 66A.

The diameter of the virtual circle connecting the radially outer ends of the protrusions 67 is equal to or larger than the inside diameter of the second inner peripheral region 12B. The second outer peripheral region 66B is fitted to the second inner peripheral region 12B at the protrusions 67. In a typical molding method such as a resin molding, it is difficult to accurately mold the outside diameter of the outer peripheral surface of the tubular portion over the entire circumference thereof. According to the present embodiment, the second outer peripheral region 66B is fitted to the inner peripheral surface 12 of the housing tubular portion 11 at the protrusions 67 protruding radially outward. Since the protrusions 67 are disposed discretely in the circumferential direction, the accuracy of positions of the radially outer ends is easily increased. As a result, the radial positioning accuracy of the bracket 61 with respect to the housing 10 can be increased.

In the present embodiment, the second outer peripheral region 66B has the six protrusions 67.

The second outer peripheral region 66B preferably has three or more protrusions 67. In addition, it is preferable that the three or more protrusions 67 are circumferentially disposed at equal intervals. This can increase the radial positioning accuracy of the bracket 61 with respect to the housing 10 in a state where the protrusions 67 and the second inner peripheral region 12B are fitted together.

The embodiment of the present disclosure may be widely used for various on-board motors for use in an electric brake, an electric clutch, an electric power steering device, and the like, as well as a variety of devices including various motors, such as a vacuum cleaner, a dryer, a ceiling fan, a washing machine, and a refrigerator.

Although the various embodiments of the present invention have been described above, the configurations described in the embodiments and the combinations of the configurations are simply examples, and therefore addition, omission, substitution, and other alterations of the configurations may be made without departing from the scope of the present invention. Furthermore, the present invention is not limited by the embodiments.

Features of the above-described preferred embodiments and the modifications thereof may be combined appropriately as long as no conflict arises.

While preferred embodiments of the present disclosure have been described above, it is to be understood that variations and modifications will be apparent to those skilled in the art without departing from the scope and spirit of the present disclosure. The scope of the present disclosure, therefore, is to be determined solely by the following claims.

The invention claimed is:

1. A motor comprising:
   a rotor configured to rotate about a central axis extending in an up-down direction;
   a stator located radially outside the rotor;
   a bracket located above the stator;
   a circuit board held by the bracket and disposed along a plane perpendicular to an axial direction; and
   a bus bar held by the bracket and connected to the circuit board at a terminal connection portion,
   wherein the bracket includes
      a board support portion supporting the circuit board from below, and
      a wall portion protruding upward to be higher than the board support portion and surrounding the circuit board, and
   wherein the wall portion has a cutout portion extending downward from an upper end of the wall portion.

2. The motor according to claim 1,
   wherein the terminal connection portion is a solder portion that connects the circuit board and the bus bar.

3. The motor according to claim 2,
   wherein the cutout portion has a bottom surface facing upward, and
   wherein the bottom surface is located lower than an upper end of the terminal connection portion.

4. The motor according to claim 1,
   wherein the wall portion has a tubular shape and surrounds the central axis, and
   wherein the terminal connection portion and the cutout portion are located to circumferentially coincide with each other.

5. The motor according to claim 1, further comprising
   a cover member covering the circuit board from above,
   wherein the cover member includes a tubular portion that surrounds the wall portion from outside,
   wherein the wall portion has an outer surface provided with a first rib that extends in the axial direction and is in contact with an inner surface of the tubular portion, and
   wherein the first rib has an upper end located lower than the upper end of the wall portion.

6. The motor according to claim 5,
   wherein the cutout portion has a bottom surface facing upward, and
   wherein the upper end of the first rib is located lower than the bottom surface of the cutout portion, or located to axially coincide with the bottom surface of the cutout portion.

7. The motor according to claim 5, further comprising
   a bearing supported by the cover member, wherein the rotor includes a shaft that axially extends with the central axis as a center and is supported by the bearing.

8. The motor according to claim 1,
wherein the board support portion includes
a base portion being in contact with a lower surface of the circuit board, and
a positioning pin protruding upward from an upper surface of the base portion, and
wherein the circuit board has a positioning hole allowing the positioning pin to be inserted therethrough.

9. The motor according to claim 8,
wherein the upper surface of the base portion is a flat surface perpendicular to the axial direction.

10. The motor according to claim 8,
wherein the board support portion includes a plurality of the positioning pins, and
wherein the plurality of positioning pins are arranged along an inner peripheral surface of the wall portion.

11. The motor according to claim 8,
wherein the positioning pin has an outer surface that is oriented in a direction perpendicular to the axial direction and continuously connected to the inner peripheral surface of the wall portion, and
wherein the positioning hole is a cutout that is open at an outer edge of the circuit board.

12. The motor according to claim 11, further comprising a cover member covering the circuit board from above,
wherein the cover member includes a tubular portion that surrounds the wall portion from outside,
wherein the wall portion has an outer surface provided with a first rib that extends in the axial direction and is in contact with an inner surface of the tubular portion, and
wherein the positioning pin is located near the first rib.

13. The motor according to claim 12,
wherein the wall portion has a tubular shape and surrounds the central axis, and
wherein the positioning pin and the first rib are disposed within an angular range of 10° about the central axis.

14. The motor according to claim 12,
wherein the positioning pin has an upper end that is located higher than an upper end of the first rib or located to axially coincide with the upper end of the first rib.

15. The motor according to claim 8,
wherein the wall portion has an inner peripheral surface provided with a plurality of second ribs circumferentially arranged.

* * * * *